US012360231B2

(12) United States Patent
Liller et al.

(10) Patent No.: US 12,360,231 B2
(45) Date of Patent: Jul. 15, 2025

(54) RADAR OBJECT CLASSIFICATION METHOD AND SYSTEM

(71) Applicant: INTEGRITY COMMUNICATIONS SOLUTIONS, INC., Colorado Springs, CO (US)

(72) Inventors: Stefan Josef Liller, Woodland Park, CO (US); David Williams, Divide, CO (US); Thomas Cloud, Colorado Springs, CO (US); Clark Phillip Mourning, Colorado Springs, CO (US); Michael Lenn Tipton, Florissant, CO (US)

(73) Assignee: INTEGRITY COMMUNICATIONS SOLUTIONS, INC., Colorado Springs, CO (US)

( * ) Notice: Subject to any disclaimer, the term of this patent is extended or adjusted under 35 U.S.C. 154(b) by 0 days.

(21) Appl. No.: 18/394,544

(22) Filed: Dec. 22, 2023

(65) Prior Publication Data
US 2024/0142609 A1 May 2, 2024

Related U.S. Application Data

(63) Continuation of application No. PCT/US2022/073374, filed on Jul. 1, 2022.
(Continued)

(51) Int. Cl.
*G01S 13/86* (2006.01)
*G01S 13/89* (2006.01)
(Continued)

(52) U.S. Cl.
CPC ............ *G01S 13/867* (2013.01); *G01S 13/89* (2013.01); *G06T 7/248* (2017.01); *G06T 7/337* (2017.01);
(Continued)

(58) Field of Classification Search
CPC ......... G01S 13/867; G01S 13/89; G06T 7/74; G06T 7/337; G06T 7/248;
(Continued)

(56) References Cited

U.S. PATENT DOCUMENTS

| 10,388,153 B1 | 8/2019 | Swaminathan et al. |
| 2013/0253754 A1* | 9/2013 | Ferguson ............. G05D 1/0231 701/28 |

(Continued)

FOREIGN PATENT DOCUMENTS

| JP | 2019070566 A | 5/2019 |
| WO | 2020123531 A1 | 6/2020 |

OTHER PUBLICATIONS

International Search Report & Written Opinion dated Nov. 30, 2022 for PCT Application No. PCT/US2022/073374.
(Continued)

*Primary Examiner* — Timothy A Brainard
(74) *Attorney, Agent, or Firm* — Dorsey & Whitney LLP

(57) ABSTRACT

Embodiments of the disclosure are drawn to apparatuses, systems, and methods for radar object classification. A radar classification system may include a number of endpoint units and a base station. Each endpoint unit includes a camera and a radar. The camera may image a scene and the image may be used to establish spatial zones within the scene. The radar may collect point cloud data from one or more objects in the scene. A classifier may determine an identity of the object based on the point cloud data. The base station may collect information such as the identity and location of objects in the scene and relate this information to the spatial zones. For example, objects may be identified as a vehicle, pedestrian, or cycle, and related to zones such as roadway, sidewalk, and crosswalk for the purpose of traffic control.

24 Claims, 8 Drawing Sheets

Related U.S. Application Data

(60) Provisional application No. 63/218,185, filed on Jul. 2, 2021.

(51) Int. Cl.
| | |
|---|---|
| *G06T 7/246* | (2017.01) |
| *G06T 7/33* | (2017.01) |
| *G06T 7/73* | (2017.01) |
| *G06V 10/764* | (2022.01) |
| *G06V 20/54* | (2022.01) |
| *G08G 1/07* | (2006.01) |

(52) U.S. Cl.
CPC .............. *G06T 7/74* (2017.01); *G06V 10/764* (2022.01); *G06V 20/54* (2022.01); *G08G 1/07* (2013.01); *G06T 2207/10016* (2013.01); *G06T 2207/10028* (2013.01); *G06T 2207/20081* (2013.01); *G06T 2207/30236* (2013.01); *G06T 2207/30242* (2013.01); *G06V 2201/08* (2022.01)

(58) Field of Classification Search
CPC . G06T 2207/10016; G06T 2207/10028; G06T 2207/20081; G06T 2207/30236; G06T 2207/30242; G06V 20/54; G06V 10/764; G06V 2201/08; G08G 1/07
See application file for complete search history.

(56) References Cited

U.S. PATENT DOCUMENTS

| | | | |
|---|---|---|---|
| 2013/0342657 A1* | 12/2013 | Robertson | H04N 13/239 |
| | | | 348/47 |
| 2014/0195138 A1* | 7/2014 | Stelzig | G08G 1/0116 |
| | | | 701/119 |
| 2018/0096595 A1 | 4/2018 | Janzen et al. | |
| 2018/0174465 A1* | 6/2018 | Ikedo | B60W 50/0097 |
| 2018/0203445 A1 | 7/2018 | Micks et al. | |
| 2018/0348365 A1* | 12/2018 | Achour | H01Q 3/46 |
| 2019/0154439 A1 | 5/2019 | Binder | |
| 2020/0086871 A1* | 3/2020 | Gotoda | G01S 17/42 |
| 2020/0410259 A1 | 12/2020 | Srinivasan | |
| 2021/0074099 A1 | 3/2021 | Caroselli et al. | |
| 2021/0103781 A1 | 4/2021 | Vigren et al. | |
| 2022/0107414 A1* | 4/2022 | Maheshwari | G06F 18/23 |
| 2022/0180131 A1* | 6/2022 | Oblak | G06F 18/251 |
| 2022/0198205 A1* | 6/2022 | Raj | G06V 20/59 |
| 2023/0204755 A1* | 6/2023 | Liu | G01S 7/412 |
| | | | 342/55 |

OTHER PUBLICATIONS

Yamawaki, Toshiki, et al., "60-GHz Millimeter-Wave Automotive Radar", Fujitsu Ten Tech. Journal, No. 11: retrieved Oct. 20, 2022 from https://www.denso-ten.com/business/technicaljournal/pdf/11-1E, 12 pages.

European Patent Office, "Extended European Search Report," mailed Mar. 31, 2025, for European Patent Application No. 22834443.8, 18 pages.

* cited by examiner

RADAR OBJECT CLASSIFICATION METHOD AND SYSTEM

CROSS-REFERENCE TO RELATED APPLICATION(S)

This application is a United States by-pass continuation of International Application Number PCT/US2022/073374 titled "Radar Object Classification Method and System" filed Jul. 1, 2022 which claims the benefit of 35 § U.S.C. 119 of the earlier filing date of U.S. Provisional Application Ser. No. 63/218,185 titled "Radar Object Classification Method and System," filed Jul. 2, 2021, the entire contents of both applications are hereby incorporated by reference, in their entirety, for any purpose.

TECHNICAL FIELD

Embodiments of the invention relate generally to radar object classification, and particularly, to relating classified objects to spatial zones.

BACKGROUND

There are applications where it is useful to determine the identity of objects, determine their location and relate that location to elements of a scene. For example, machine vision applications may use cameras to capture images of the scene, and image processing software may identify objects in the scene. However, imaging-based applications may generally be limited to passively collecting light within (or near) the visible electromagnetic spectrum. Various environmental conditions may interfere with this imaging. For example, if the camera is located outdoors, inclement weather such as rain, snow, and/or fog may obscure or even block the image, degrading the system's ability to function, e.g., the system may not be able to identify objects within the scene. As such, there is a need for systems that are not significantly impacted or degraded by environmental conditions.

SUMMARY

In at least one aspect, the present disclosure relates to an apparatus including a camera which collects an image of a scene, a radar unit which generates data based on an object in the scene, a processor and machine readable instructions. The machine readable instructions, when executed by the processor, cause the apparatus to determine a point cloud based on the data from the radar unit, classify the object based on the point cloud to determine an identity of the object, determine a position of the object within a scene based on the point cloud, and output the position and identity of the object.

The machine readable instructions, when executed by the processor, may cause the apparatus to relate the identity and position of the objects to one or more spatial zones in the scene. The apparatus may control a traffic signal based on the relationship between the identity and position of the object to the one or more spatial zones. The radar may generate first data at a first time and second data at a second time, and the machine readable instructions, when executed by the processor may cause the apparatus to determine a velocity of the object based on a change in position between the first data and the second data. The radar unit may operate using 60 GHz electromagnetic radiation.

The machine readable instructions, when executed by the processor may cause the apparatus to update the relationship of the identity and position of the object to the one or more spatial zones in real time. The apparatus may include a GPS which provides spatial data. The machine readable instructions, when executed by the processor may cause the apparatus to relate the location of the radar unit to the spatial data. The apparatus may include a display, and the machine readable instructions, when executed by the processor may cause the system to display a tracking image on the display.

In at least one aspect, the present disclosure relates to a method. The method includes capturing an image of a scene with a camera, defining spatial zones based on the image of the scene, generating point cloud data of an object in the scene based on radar data of the scene, classifying the object based on the point cloud data to determine an identity of the object, locating the object in the scene based on the point cloud data, and relating the identify and the location of the object to one or more of the spatial zones.

The scene may include a road, and the method may include classifying the object as a vehicle, a pedestrian, or a cyclist. The method may include adjusting the timing of a traffic signal based on the relationship between the identity and location of the object to the one or more spatial zones. The method may include generating the point cloud data with a first processor in an endpoint unit and relating the identity and the location of the object to the one or more of the spatial zones with a second processor in a base unit. The method may include collecting the radar data at 60 GHz. The method may include locating the object at a first time and a second time and determining a velocity of the object based on the location of the object at the first time and the location of the object at a second time. The method may include displaying tracking images of the identified objects In at least one aspect, the present disclosure relates to a method, the method including detecting an image of an object in a scene, capturing point cloud data of the object in the scene with a radar, identifying the object based on the image, and training a machine learning model to identify the object from the radar point cloud data based on the associated identified object in the image.

The method may also include registering the image to the point cloud data. The method may include detecting images based on an application of the trained machine learning model. The method may include d the image using a camera, where the camera and the radar are both located in an endpoint unit. The method may also include detecting a sequence of images each including the object, capturing a sequence of point cloud data of the object, and training the machine learning model to identify the object in the sequence of point cloud data based on the sequence of images. The method may also include training the machine learning model to identify the object as a vehicle, a pedestrian, or a bicycle. The method may also include collecting second point cloud data of a second object using a same or a different radar and identifying the second object using the trained machine learning model.

In at least one aspect, the present disclosure may relate to a system including at least one endpoint unit and a base station. The at least one endpoint unit each include a camera which collects an image of a scene, a radar unit which generates data based on an object in the scene, and a first processing unit which generates point cloud data based on the data from the radar, and classifies an identity of the object based on the point cloud data. The base station includes a second processing unit which receives the identity and the location of the object from the at least one endpoint units and relates the location and the identity of the object to a spatial zone in the scene.

The endpoint units can be positioned to image a roadway. Each of the first processing units may classify the object as a vehicle, a pedestrian, or a cyclist. The base station may also adjust timing of a traffic signal based on the relationship of the location and identity of the object to the spatial zone information. The base station may display tracking images based on the identity and the location of the object. The base station may count a number of a type of object which crosses the spatial zone.

DETAILED DESCRIPTION

Figure 1:
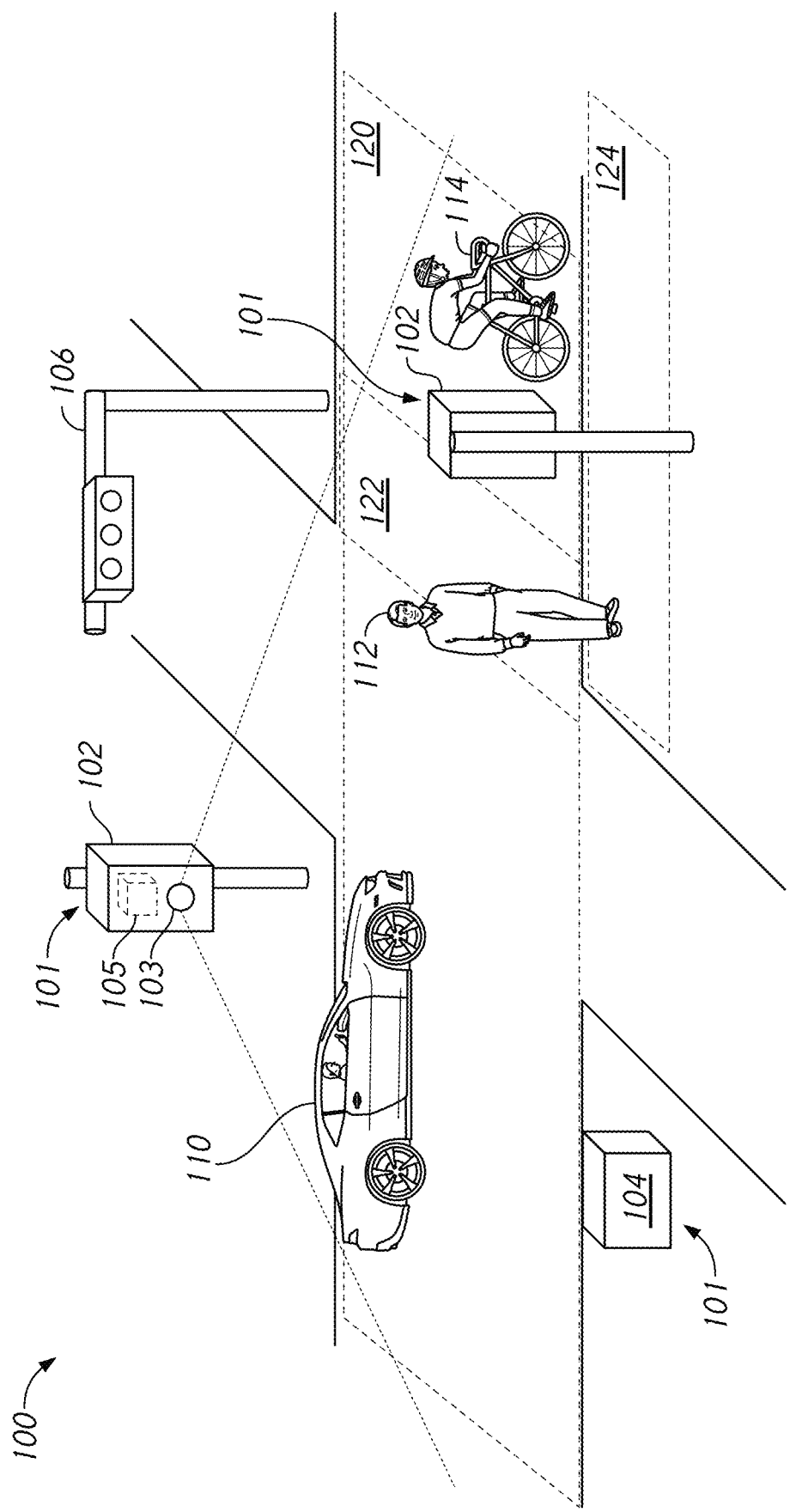
FIG. 1 is a diagram of a radar identification system including a radar system may be deployed to detect objects within a scene according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration, specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Many systems and applications may benefit from a system capable of identifying objects, determining properties of the objects, such as position and/or velocity, and then relating the objects and properties to a scene. For example, in many transportation applications (e.g., traffic flow control applications, traffic accident monitoring applications, and the like), it may be useful to include a sensor that distinguishes between a road and a sidewalk, determines a type of object (e.g., car or pedestrian) and relates that object to the scene (e.g., if the car is in the sidewalk, an alert may be issued, etc.). Machine vision applications using cameras may offer an intuitive approach to collecting such data, especially if a user is reviewing the images. However, in many environments, weather (e.g. rain, snow, fog, smoke, etc.) or other conditions (e.g., low light) may degrade the image quality, preventing useful data from being collected or analyzed. In addition, the visual spectrum may be limited in terms of the information it collects about an object or scene.

Radar (radio detection and imaging) systems generate electromagnetic waves (e.g., generally in the radio or microwave spectra) and receive reflections of the generated waves from objects in the scene. The reflections can be analyzed to determine properties of the objects such as size, distance, and/or velocity. Radar systems may be set up to operate at wavelengths of the electromagnetic spectrum which may offer advantages over the visual spectrum. For example, radar may operate at wavelengths such that common weather phenomenon or other visibility conditions do not substantially interfere with the collection of data. It may be useful to combine radar with other information to classify and locate objects within a scene.

The present disclosure is drawn to apparatuses, systems and methods for radar-based object classification that can be implemented with or used as a part of one or more applications (e.g., traffic control applications, property security applications, and the like). In various examples, the radar classification system includes a camera and a radar unit. The information from the two sensing modalities (e.g., visible light and/or radio waves) may be combined or otherwise overlaid together to identify and track objects within a scene. The detected objects may be used by the use-case application, e.g., security system, to output information to a user, such as alerts, movement data, and the like.

In one example, the camera may be used as part of an initialization or calibration to collect initial images of a scene. The image may be used to identify and optionally overlay spatial or detection zones on the scene. For example, if the scene is a roadway, the zones may include 'road', 'sidewalk', 'crosswalk', 'curb', etc. The zones can be automatically generated based on the image (e.g., using a machine learning network), manually set-up by a user (e.g., by receiving manually input tagging or identifying outlines in the images), and/or combinations thereof (e.g., initial outlines identified by computer vision and verified by a user). The spatial zones may be utilized to categorize certain objects and/or provide information to a user regarding movement of objects within specific zones, and/or assist in the analysis of objects (e.g., object present in the road portion of the scene and moving at a particular velocity may be initially categorized as a vehicle as compared to objects positioned in different zones).

The camera and the radar modules may be co-located or otherwise calibrated to the location of one another, such that data collected from both modules may be mapped to one another, e.g., the radar information collected from the scene can be correlated to the image information collected from the scene, to provide multiple types of data for various objects. In other words, a radar signature for a car captured within the scene can be correlated with image information representative of the car.

During operation, the radar system may collect radar data from the scene, e.g., by generating and receiving reflections of radio waves from various objects within the scene. In some instances, the data from the scene may be collected as one or more point clouds. The point clouds represent the reflectivity, doppler velocity, and position of objects present in the scene. Based on the collected information in the point cloud, the information may be analyzed, e.g., by a classifier or other machine learning algorithm or model, to identify various objects within the scene. As a specific example, a classifier identifies the object based on derived properties of the point cloud (e.g., size, shape, velocity, position). The classifier may be trained to identify objects based on a training set of different point clouds labelled as different objects based on images of those same objects. The point cloud is also used to determine a location of the object. If the object is tracked over time, a predicted position, velocity, and acceleration may also be obtained for example by mapping a displacement of a centroid of the point cloud over time. The identity and location of the object are compared to the zones, and actions may be taken based on the identity and properties of the object in relation to the zones.

The classifier may be trained based on images from the camera and point clouds collected by the radar. For example, a system may be placed at a scene and may capture images that are correlated or co-located with radar information (e.g., the image field of view may substantially overlap with the radar field of view for the same scene and time frame). The images and the radar information may be registered to each other. For example, the images and radar information may be co-registered in both space and time, such that there is at least a portion of the fields of view of both the camera and radar systems which overlap, and the two systems are recording at the same time. Objects may be identified in the images (e.g., manually by a user, by an automatic process, or combinations thereof). Since the images and radar are registered, the identified object in the image may be associated with a point cloud in the radar data. A machine learning model may be trained based on the identified objects in the image to identify the object based on information from the radar data. The classifier may then be able to recognize such objects based on their point cloud information.

In an example application, the radar classification system can be implemented as part of a traffic control application that is used to provide traffic updates, alerts, and/or predictions to a traffic engineer. As one example, during use, if an object is identified as a vehicle and a position of the vehicle is matched to a zone which is in a roadway at a stop light, the timing of the stoplight may be adjusted to account for the fact that a vehicle is waiting at the light (e.g., the timing of the stoplight may be increased to allow the vehicle to proceed through the light faster, reducing the "red light" cycle). In another example, a traffic survey may be performed where a number and/or type of vehicles is counted as they pass along a road. The system may present a user with various outputs, such as a display which shows an image of the scene (e.g., a video), along with an overlay which shows the objects in the scene which have been identified based on the radar information. The user may instruct the system to perform various tasks (e.g., by manually drawing zones and/or providing instructions for one or more applications). The use of a radar system may be advantageous over other systems for detecting the vehicle, as the radar may function even in extreme weather conditions (e.g., a snowstorm) and does not rely on the vehicle having any particular composition (e.g., an induction sensor may require the vehicle to have a certain amount of metal components).

In another example, the radar classification system may be implemented with public safety applications. For example, if the system identifies an object, such as a vehicle, exceeding a speed limit for an area, an alert may be generated by the public safety application and used to provide enforcement of the speed limit, e.g., by issuing a citation to the driver. In yet another application, alerts may be generated when vehicles or persons are identified as crossing a distance threshold or other location that may be within a security perimeter or the like.

FIG. 1 is a diagram of an example radar system and an example environment the radar system may be deployed in according to some embodiments of the present disclosure. The radar system 101 includes one or more endpoint units 102 and an optional base unit (or station) 104. The radar system 101 may be deployed in an environment to capture data about all or a portion of a scene 100 within the environment. For example, the scene 100 may represent one or more fields of view where the endpoint units 102 capture information. In FIG. 1, the scene 100 represents a particular example application of the present disclosure. In particular, the scene 100 of FIG. 1 shows a roadway intersection which, for example, includes a road 120, crosswalk 122, sidewalk 124, traffic signal 106 and various objects (e.g., cars 110, bicycles 114, and/or pedestrians 112) which may be passing through the scene 100. As described herein, the radar system 101 according to the present disclosure may advantageously function in other example applications.

In the scene 100, shown is an example radar system 101 which includes two endpoint units 102 and an optional base unit or stations 104. More or fewer endpoint units may be used in other example embodiments. The endpoint units 102 may each include a camera 103 configured to image the scene 100 and a radar unit (or simply radar) 105, configured to identify and determine a position of one or more objects (e.g., vehicle 110, pedestrian 112, and/or cycle 114) within the scene 100. The system 101 may establish spatial zones in the scene, such as roadway zone 120, crosswalk zone 122, and sidewalk zone 124. The system 101 (e.g., in the endpoint units 102 and/or base station 104) may include one or more processors that utilize radar data from one or more of the endpoint units 102 to locate the identified objects relative to the zones 120-124. In some embodiments, various actions may be taken by the system 100 based on the identity and location of the objects. For example, the timing of traffic light 106 may be adjusted based on the presence of a pedestrian 112 in the crosswalk zone 122. In another example, the system 101 may collect information about the usage of the scene 100, for example by counting vehicles 100 which drive a certain direction along the road 120.

The endpoint unit(s) 102 may be positioned around the environment to capture sufficient data about the scene 100 to enable a radar classification system 101. Each of the endpoint units 102 has a field of view. One or more endpoint unit(s) 102 may be positioned at different locations around the scene to include at least a portion of the scene 100 in their respective fields of view and provide imaging coverage of (all or a portion of) the scene 100. In some examples, the endpoint units 102 may be mounted (e.g., on poles, to buildings, mounted on the ground, etc.) such that the field of view of each endpoint unit 102 includes at least a portion of the scene thus providing coverage of an area of the scene 100. In some embodiments, the radar classification system may include a plurality of endpoint units 102 suitably arranged to encompass in their respective fields of view at least a portion of multiple different (e.g., non-collocated) scenes, such as two different roadway intersections that are separated by one or more connecting roads. In some embodiments, the endpoint units 102 and/or base station 104 may be mounted on a structure specifically configured and/or dedicated for mounting the respective endpoint unit or base station. In other embodiments, the endpoint units 102 and/or base station 104 may be mounted on existing infrastructure, for example light poles, traffic signal poles, power or telephone poles, etc. The endpoint unit(s) 102 and/or base station 104 may have dedicated power supplies, and/or may be coupled to power used for existing infrastructure (e.g., if the endpoint unit is mounted on a light pole, power supplied to the light pole may also be used to power the endpoint unit). In some embodiments, dedicated power supply associated with a given endpoint unit and/or base station may be contained, at least in part, within a weather-resistant enclosure of the endpoint unit and/or base station.

The fields of view of two or more endpoint units 102 may overlap in some situations, may cover the same portion of the scene from different angles, or combinations thereof. While two endpoint units 102 are shown in FIG. 1, more (e.g., 5, 10, 15, 20, 30, 50, 100, 200, 300 or other numbers) or fewer (e.g., 1) endpoint units 102 may be used in other example embodiments. In embodiments where an optional base station is used, the endpoint units 102 may be communicatively coupled to the base station 104 using a wired connection, a wireless connection, or combinations thereof. In some embodiments, the base station 104 may be located at or near the scene 100 (e.g., in the example of FIG. 1, along the roadway). In some embodiments, the base station 104 may be remote from the scene 100, such as at a traffic control facility which may be miles away from the intersection illustrated in scene 100. In some embodiments, the base station 104 may receive data from endpoint units 102 located at different, spatially-distant scenes. In some embodiments, the base station 104 may be omitted entirely, and the end point units 102 may operate without communicating with a base station. In some embodiments, the endpoint units 102 may be communicatively coupled with each other.

The endpoint units 102 may include a camera 103 and a radar 105. The camera 103 and radar 105 may be contained together within a housing, and may have overlapping fields of view. The camera 103 is arranged to capture a camera image of at least a portion of the scene, which may be used to establish a field of view of the endpoint unit 102 relative to the scene. One more images captured by the camera of endpoint unit 102 may be used to establish one or more zones (e.g., zones 120-124) associated with the radar classification system. In some embodiments, the camera 103 generates one or more images of the portion of the scene 100 which is in the camera's field of view. The image(s) may be used in an initialization (e.g., calibration or set-up) process of the radar classification system at the physical location of scene 100, such as for the identification of one or more different zones 120-124 in the scene. In some embodiments, zone(s) may be defined, based on the image(s), at least in part by a user such as by the user defining or drawing boundaries of the one or more zones. In some embodiments, a processor (either in the endpoint unit 102 or the base station 104) may additionally or alternatively identify one or more of the zones, such as by using object recognition and/or a properly trained machine learning model. In some embodiments, the camera may be used to update the zones (e.g., periodically) after an initial set-up of the radar classification system, such as by taking subsequent images of the scene 100. In some embodiments, zones may be redrawn after the initialization phase. In some embodiments, zones may be updated based on the application which is desired (e.g., if it is desired to count pedestrians in a crosswalk, a crosswalk zone may be defined, even if none was used in a previous application).

The zones may define an area of the scene associated with a type or use based on an application of the radar classification system. For example, in traffic control applications there may be zones such as a roadway zone 120, a crosswalk zone 122, and a sidewalk zone 124. While only one zone of each type is shown in FIG. 1, there may be more or fewer of each type of zone. Similarly, there may be additional types of zones (e.g., shoulder, curb, building, bike lane, parking area, etc.) which are not shown in FIG. 1. The type of zone may be associated with a different size and/or shape. The zone may also have a label or other unique identifier which may designate the type of zone (e.g., road, sidewalk). One or more zones of a same type, and/or one or more zones of different types may, in some instances, overlap at least partially. In some embodiments a zone in the scene 100 may fall partially within the field of view of the camera of one endpoint unit 102 and may extend into the field of view of the camera(s) of at least one other endpoint unit 102.

The radar 105 in each endpoint unit 102 collects data from a portion of the scene. The radar may be a beamforming radar and/or a multiple input multiple output (MIMO) radar. The field of view of the camera and the field of view of the radar in each endpoint station 102 may or may not overlap, and may have different sizes, shapes, etc. The radar is configured to transmit electromagnetic energy outwards using an antenna array. The radar collects data based on the reflected electromagnetic energy, where the variation between the generated/emitted energy and the reflected energy provides information regarding various objects within the scene. In some embodiments, the radar 105 is configured to use electromagnetic energy at a frequency of 60 GHz, however, in other embodiments other frequencies may be chosen, which may depend upon the specific application of the radar classification system or other factors. For example, the use of 60 GHz radar may be particularly advantageous in outdoor applications, as 60 GHz electromagnetic radiation may penetrate weather conditions such as snow and rain more easily than other frequencies.

The raw data collected by the radar is used to generate a point cloud, which includes points of reflection in the scene (e.g., from the edges or surfaces of various objects present in the scene). In some embodiments, each endpoint unit 102 may include a processor which processes the raw data detected by the radar array into a point cloud and then transmits the point cloud to the base station 104. In some embodiments, the endpoint unit may perform further processing at the endpoint unit. The point cloud may represent a portion of the total radar data associated with a given object. The point cloud may be a collection of points representing reflections from surfaces and/or edges of a given object. The overall radar data may contain several point clouds. When objects are relatively far apart, the point cloud of one object may be distinguished from the point cloud of another object by spatial separation between the point clouds in the radar data. In some situations, point clouds may represent multiple objects (e.g., when two objects are close together) and point clouds may merge and separate over time as objects move past each other. Various methods may be used to segment the data into point clouds. In some embodiments, the endpoint units 102 may pass the raw data directly to the base station 104 and the base station 104 may determine the point cloud from the raw radar data.

One or more processors, either located in the endpoint units 102 the base unit 104, is configured to determine one or more properties associated with the point cloud. For example, a size and shape of the point cloud and/or a cluster of points in the point cloud may be determined. A location of the point cloud and/or cluster of points may also be determined, for example by determining a centroid of the point cloud and/or cluster of points and then determining the location of the centroid. In some embodiments, the radar may collect temporally spaced samples of data, and the velocity of the point cloud, or of points or clusters of points in the point cloud, may be determined, e.g. by tracking the centroid over time and/or the use of any suitable Doppler velocity estimation technique.

The endpoint units 102 and/or the base station 104 may include a processor which implements a classification model (or simply classifier). The classifier may identify one or more objects represented by the point cloud based on one or more properties associated with one or more points in the point cloud (e.g., size, location and/or velocity) and/or the zone the point cloud is located within. For example, if the point cloud is below a certain size, then the object is more likely to be a pedestrian or bicycle rather than a vehicle. In embodiments where data is captured over time, if the object is travelling above a certain speed, then it may be more likely to be a vehicle.

The classifier may be implemented by a machine-learning model of any suitable architecture (e.g., a convolutional neural network, support-vector machine (SVM, K-nearest neighbors (KNN)) trained to classify points and/or clusters of points in a radar point cloud as one or a plurality of predetermined categories of objects (e.g., one or more types of vehicles, a pedestrian, a cyclist, etc.). For example, based on a size and velocity of one or more points of the point cloud, the point(s) may be classified as corresponding to an object of a particular category (e.g., a vehicle 110, a pedestrian 112, a cyclist 114, etc.). In some embodiments, unique identifiers may be assigned to each classified object in the scene (e.g., Vehicle001, Vehicle002, Bicycle001, etc.). These unique identifiers may remain associated with the object as it moves through the scene 100.

Based on the classification of one or more objects in the scene and additional information associated with the object(s), such as the object's location and/or velocity, the system 101 may take one or more actions, which may include generating and transmitting a control signal to the application or system, e.g., to a controller and/or providing information to an external system (e.g. a traffic control system) that operates one or more controllers which may take actions based on the information received from the base station 104).

In some examples, the base station 104 may be coupled to one or more traffic signals 106 (and/or to a controller of the traffic signal 106) and may adjust the timing of the traffic signal based on the classification of the object(s), and its location and/or velocity in relation to one or more of the zones. For example, if the system detects a pedestrian 112 in the crosswalk zone 122 and determines that based on the velocity the object will not exit the crosswalk zone before the scheduled change of the signal light, the timing of the signal light 106 may be altered so that traffic remains stopped while the pedestrian 112 is in the crosswalk 122 (e.g., the red light cycle timing may be increased for the vehicle). Similarly, if the system detects a vehicle object approaching the intersection at a velocity at which the vehicle would be unable to stop safely before the schedule change of the traffic signal, the timing of the change of the signal for the cross traffic may be altered to avoid a collision. In some examples, the system 101 may monitor the scene.

For example, a number of vehicles which pass through the scene may be counted to monitor road use/congestion. Various other traffic control and/or monitoring scenarios can be envisioned and appropriate actions programmed into the system based on the classification of the object and its location and/or velocity as it relates to the zone in which the object is located.

While the present disclosure is generally described with respect to traffic applications, the system 101 may also be adapted for various other applications. For example, the scene may include a sensitive area, and a secure zone may be defined. If a pedestrian is detected entering the secure zone, then the system may take various actions (e.g., sending an alert).

Figure 2:
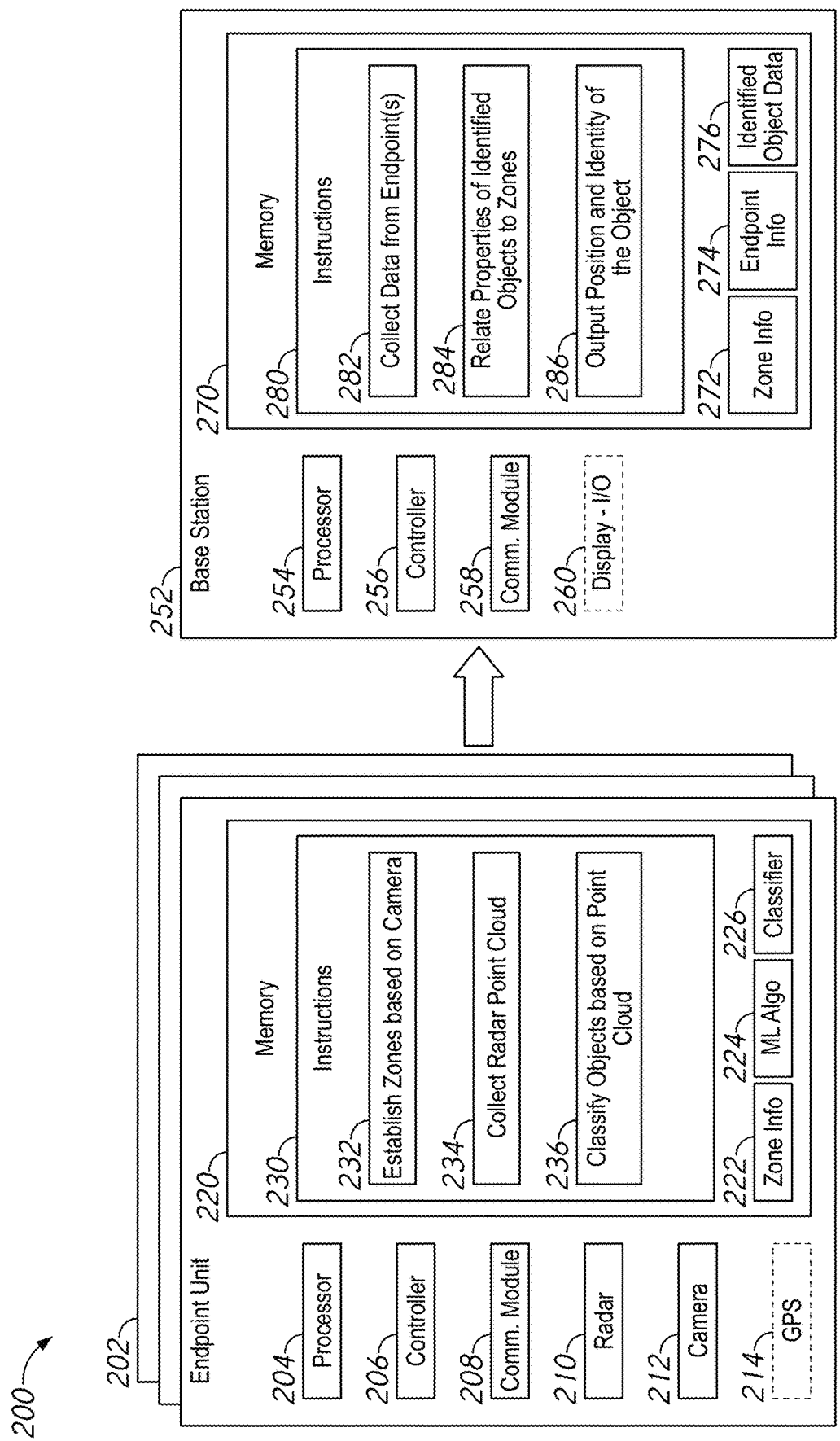
FIG. 2 is a block diagram of a radar identification system according to some embodiments of the present disclosure.

FIG. 2 is a block diagram of a radar identification system according to some embodiments of the present disclosure. The radar identification system 200 may, in some embodiments, be included in the scene of FIG. 1. For example, the endpoint units 202 may implement the endpoint units 102 of FIG. 1, and the base station 252 may implement the base station 104 of FIG. 1. The radar identification 200 shows an example embodiments where various components are split between a set of endpoint units 202 and a base station 252. However, other embodiments of the present disclosure may not include a base station 252, and the functions and/or components described with respect to the base station 252 may be performed on the endpoint unit(s) 202 instead.

Each endpoint unit 202 includes a processor 204, a controller 206, a communications module 208, a radar 210, a camera 212, a global positioning system (GPS) 214, and a memory 220. The memory 220 may include various instructions 230, along with other information (e.g., zone information 222, a machine learning (ML) model 224, and/or a classifier 226). The processor 204 may execute the instructions 230 for example, to collect and classify objects based on data from the radar 210. The base station 252 includes a processor 254, controller 256, communications module 258, and optional display and input/output (I/O) 260. The base station 252 also includes a memory 270 which includes instructions 280 and various additional information such as zone information 272, endpoint information 274, and data about the identified object 276 provided by the endpoints.

Each endpoint unit 202 may include similar hardware. For the sake of brevity only a single example endpoint unit 202 is explained in detail. The endpoint unit 202 includes a camera 212 which may image a portion of a scene within a field of view of the camera 212. The processor 204 may execute box 232 of the instructions 230, which describes establishing spatial zones based on the camera images. The processor 204 may use the controller 206 to operate the camera 212. The spatial zones may have a geographic location in the scene (e.g., a size and shape) along with a type. The memory 220 may include zone information 222, which may specify types of zones for the current application of the radar classification system. The box 232 may be executed as part of an initialization process. In some embodiments, a user may set up the zones (e.g., through a graphical user interface (GUI) presented on display and I/O 260 coupled to the endpoint unit(s) 202 via the communication modules 208 and 258). In some embodiments, an automatic process, such as a trained machine learning model 224 may be used to automatically establish the zones based on the image. For example, the machine learning model 224 may be trained on a training set of images which include labelled zones of different types. The trained machine learning model 224 may then receive images from the camera 212 and generate zones based on the training In some embodiments, a mix of automatic and manual zone designation may be used. For example, the machine learning model 224 may establish zones, and the processor may present a representation of the zones (e.g., overlaid on an image) to a user (e.g., via display and I/O 260), who may then edit the automatically established zones, or add or subtract zones. Once the zones are established, they may be saved in the zone information 222 of the endpoint unit and/or collected in the zone information 272 of the base station 252. The zone information may be updated as needed based on various operations.

During normal operation, the endpoint unit 202 may collect data using the radar 210. The processor 204 may execute box 234 of the instructions which describes collecting radar point cloud data. The processor 204 may use the controller 206 to operate the radar 210. The radar 210 may transmit electromagnetic radiation, and then receive reflections of that emitted radiation from objects in the scene. A frequency may be chosen which is not substantially interfered with by weather conditions. In some embodiments, the radar 210 may operate at a frequency of 60 GHz. For example, 60 GHz may be particularly advantageous as it penetrates common weather conditions such as snow, which may interfere with other electromagnetic frequencies. Other frequencies (e.g., 24 GHz) may be used in other example embodiments. The processor 204 may receive raw data from the radar and process the raw data into a point cloud or a collection of point clouds. In some embodiments, additional hardware and/or software may be used to condition or otherwise pre-process the raw radar data. For example, filters may be used to cut down on noise in the raw data. The point cloud data may be saved to the memory 220. The radar data may be updated over time. For example, the radar 210 may collect new data at a given rate and update the point cloud data accordingly. The size, shape, number, and locations of the point clouds may change with each set of data collected.

The processor 204 may execute box 236 which describes classifying objects based on the point cloud data. The memory may include a classifier 226 which may analyze the point cloud data to determine an identity of the object represented by the point cloud. For example, the classifier 226 may include a trained machine learning model. The classifier 226 may be trained on a training set of example point clouds which have been labelled with a type of object that they represent. The classifier 226 receives the point cloud data from the radar 210 and identifies the object based on the training data set. In some embodiments, the classifier 226 may be trained on the same system 200 which is used to monitor objects. In some embodiments, the classifier 226 may be trained based on a different system and loaded onto the system 200. The training of the classifier is discussed in more detail in FIGS. 6-7.

In addition, to determining an identity of the object, the processor 204 may identify various other properties of the point cloud. For example, a location of the object may be determined based on a centroid of the point cloud. In some embodiments, the endpoint units 202 may include a GPS system 214, which may relate the location of the object to a coordinate system (e.g., latitude and longitude). In some embodiments, each point of the point cloud may be associated with a signal-to-noise ratio (SNR) and the centroid may represent an average location weighted by the SNR of each point in the point cloud. In some embodiments a speed and/or velocity of the point cloud may be determined by tracking a change in location over time. The classifier 226 may use a size and/or shape of the point cloud to determine the type of the object.

In some embodiments, the images from the camera 212 may be used to correlate the radar data to improve the confidence that the identification of the objects are correct. For example in conditions where the camera data is good (e.g., sufficient light, field of view not obstructed by weather), the camera data may be used to increase a confidence of the classifier 226 that the number and size of objects represented by the point cloud(s) is correct. The images from the camera 212 and the radar data from the radar 210 may be registered to each other in space and/or time. For example, the images and radar data may capture overlapping fields of view and/or may capture data at the same time. Accordingly, objects identified in the radar point cloud may have associated objects in the images.

In some embodiments, additional properties of the radar point cloud may be used to help classify the object. For example, if the object is located in a road and is traveling above a certain velocity, then it may be more likely that the object is a vehicle rather than a pedestrian. The classifier 226 may weight its guesses based on such additional information.

The types of objects and the types of zones may be chosen from a list which is application specific. For example, if the application involves monitoring traffic at an intersection, the types of objects may include vehicles, pedestrians, and cyclists, and the zones may include road, sidewalk, and crosswalk. In another example application, which involves monitoring a chain up station along the shoulder of a road (where snow chains are attached and/or removed from vehicles), the types of objects may be different types of vehicle (e.g., truck vs. car) and the zones may include road and shoulder. In some embodiments, the machine learning model 224 and/or classifier 226 may be trained based on the chosen application. For example, the types of objects and labels in the example point cloud data used to train the classifier 226 may vary by application.

The endpoint units 202 may be coupled to the base station 252 using respective communications modules 208 and 258. The endpoint units 202 may be coupled to the base station 252 using wired connections, wireless connections, or combinations thereof. For example, the communication module 208 may be a wireless communication module (e.g., WiFi, radio, Bluetooth, etc.) in communication with the communication module 258, which may also be a wireless communications module. In some embodiments, a mix of wired and wireless communications may be used.

Similar to the endpoint units 202, the base station may include a processor 254 and controller 256 which may execute instructions in a memory 270 analogous to the processor 204, controller 206 and memory 220 of the endpoint units 202. In some embodiments, the base station 252 may use different types and/or specifications of processor 254, controller 256, communications module 258, and/or memory 270 to the endpoint units 202.

The base station 252 may gather information generated by the endpoint units 202, process that information into an output, and may also provide commands to operate the endpoint units.

The processor 254 may execute block 282 of the instructions 280. Block 282 describes collecting data from one or more of the endpoint units 202. For example, during an initialization, the base station 252 may collect zone information from the endpoint units 202, as well as information about the endpoint units themselves. For example, the base station 252 may collect GPS coordinates or other information about the location of the endpoint units 202 in a collection of endpoint unit information 274. The locations of the endpoint units 202 in the endpoint information 274 may be useful for relating the information from the endpoint units 202 to each other and to the scene.

During normal operation, the base station 252 may retrieve radar data from the endpoint units 202. For example, the base station 252 may cycle through the endpoint units 202 collecting data from each one in a sequence and then repeat that sequence to gather new data. In embodiments where the classification happens at the endpoint units 202, the base station 252 may collect information about the identified objects such as their location, identity, and/or velocity. In embodiments where the base station performs such classification, the base station 252 may receive the point cloud data and then perform the classification at the base station 252. Either way, the data may be saved on the memory 270 as identified object data 276

The base station 252 may have the processor 254 execute block 284 which describes relating properties of the identified object(s) to the zones. The identified object data 276 may be compared to the zone information 272. For example, each object(s) location data may be used to determine which zone (or zones) it is located in, passing through, etc. Other properties of the identified objects may also be considered. Which properties are compared may be application-specific.

In some embodiments, based on the relationship between objects and zones in the scenes, the processor 254 may execute block 286, which describes outputting the position and identity of the object. For example, the position and identity may be output to a database or otherwise saved in the memory 270. In some embodiments, the position and identity may be output to an application, such as an application which counts a certain type of object (e.g., a vehicle). In some embodiments, the output information may be related to the identified zones. For example, the position and identity of objects which pass through a certain zone may be recorded (e.g., to count a number of vehicles which drive along a road). In some embodiments, a tracking image may be displayed to the user (e.g., on display 260). For example, the tracking image may include a graphical representation of the identified objects (e.g., a bounding box, a label, marker, etc.). In some embodiments, the tracking image may include an overlay with a representation of the scene 100. In some embodiments, the tracking image may include overlaying information with data collected by the camera 212 and/or radar 210. For example, an image of the scene may be presented along with graphical overlays which identify the objects in the scene. For example, an image of the scene may be displayed along with a label which uniquely identifies each object in the scene.

In some embodiments, the memory may also include instructions which cause the system 200 to take action based on the identified object(s) and/or those object(s) determined relationship to the zone(s) of the scene. What actions are available may be application-specific. For example, the identity of the object may be compared to the type of zone it is located in, and action may be taken based on that comparison (e.g., emergency services may be notified if an object identified as a vehicle is located on a sidewalk). In some embodiments, additional properties of the object may be considered (e.g., if an object identified as a vehicle has a speed above a threshold and a distance from an intersection zone below a minimum, then a timing of a yellow light may be extended to prevent a collision).

An example application may include monitoring a section of road and/or shoulder to determine where there is space for vehicles to pull over. For example, a stretch of road may be monitored to determine if trucks can pull over in order to apply snow chains. The endpoint unit(s) may be positioned along the roadway (e.g., attached to light poles or other vantage points) to view the road and the shoulder. The camera may image the roadway and the processor 204 may establish a pull-over zone along a section of the roadway (and/or a dedicated shoulder) set aside for vehicles to pull over. During operation, the endpoint unit(s) 202 may identify vehicles based on the radar point clouds. In some embodiments, only trucks may be identified and objects smaller than trucks (e.g., cars) may be ignored. The base station 252 may relate the location information of the identified trucks to the pull-over zone. Spacing between the trucks which are within the pull-over zone may be determined, and the base station 252 may indicate where there are large enough spaces in the pull-over zones (e.g., between trucks) for additional trucks to pull over and apply chains. This information may be updated as trucks pull into and out of the pull-over zones. Information about open spaces may be used, for example, to monitor usage of the pull-over zone and/or to direct drivers to open places to pull-over.

An example application may include monitoring traffic at an intersection. For example, as shown in the example of FIG. 1, the endpoint unit(s) 202 and base station 252 may be disposed around an intersection, such that the endpoint unit(s) 202 have views of the intersection. Objects in the intersection may be classified as a vehicle, a pedestrian, or a cycle. Zones may include roadways, crosswalks, and sidewalks. Based on the relationship between these objects and zones determined by the processor 254, the controller 256 may provide information and/or control signals. In some embodiments, the radar system 200 may monitor traffic in the intersection to provide feedback, for example on usage of the intersection. In some embodiments, the base station 252 may provide signals which adjust the timing of one or more traffic signals which control the intersection. For example, the base station 252 may provide a signal which indicates that a pedestrian is in the crosswalk, which may cause a controller of the traffic signal to lengthen a timing of walk signal.

In some embodiments, an optional display and/or I/O system 260 may be coupled to the base station 252 to allow a user to view results and/or provide instructions to the system 200. In some embodiments, a display and/or input devices may be coupled to the base station (e.g., a monitor, keyboard, mouse, touchscreen, etc.). In some embodiments, an external device (e.g., a tablet, smartphone, laptop, etc.) may be coupled to the base station 252. In some embodiments, the base station 252 may use the communications module 258 to communicate with an external device (e.g., a computer at a remote location). For example, a user may view a visualization of the data collected by the base station 252. The user may also input commands to adjust the operation of the radar system 200, change a mode the radar system 200 is operating in, upload or change application specific data or other interactions. An example display presented to the user is discussed in more detail in FIG. 8.

In some embodiments, a user may be able to interact with the endpoint units 202, either through the base station 252 or directly (e.g., by directly coupling an I/O device to the endpoint rather than coupling through the base station). For example, the user may be able to pull raw information from one or more endpoints 202 for diagnostic, calibration, and/or monitoring purposes. Similarly, in some embodiments, a user may be able to issue commands to a particular endpoint, for example, to adjust its zones or other settings on an individual level.

FIG. 2 shows a particular example embodiment and a particular division of instructions and information between the endpoints 202 and base station 252. However, other arrangements of functions may be used in other example embodiments. For example, in some embodiments, instructions like box 236 may be located in the base station instructions 280 instead of the endpoint unit instructions 230. In some embodiments, the functions of the base station 252 may be integrated into each of the endpoints 202, and no separate base station 252 may be used.

Figure 3A:
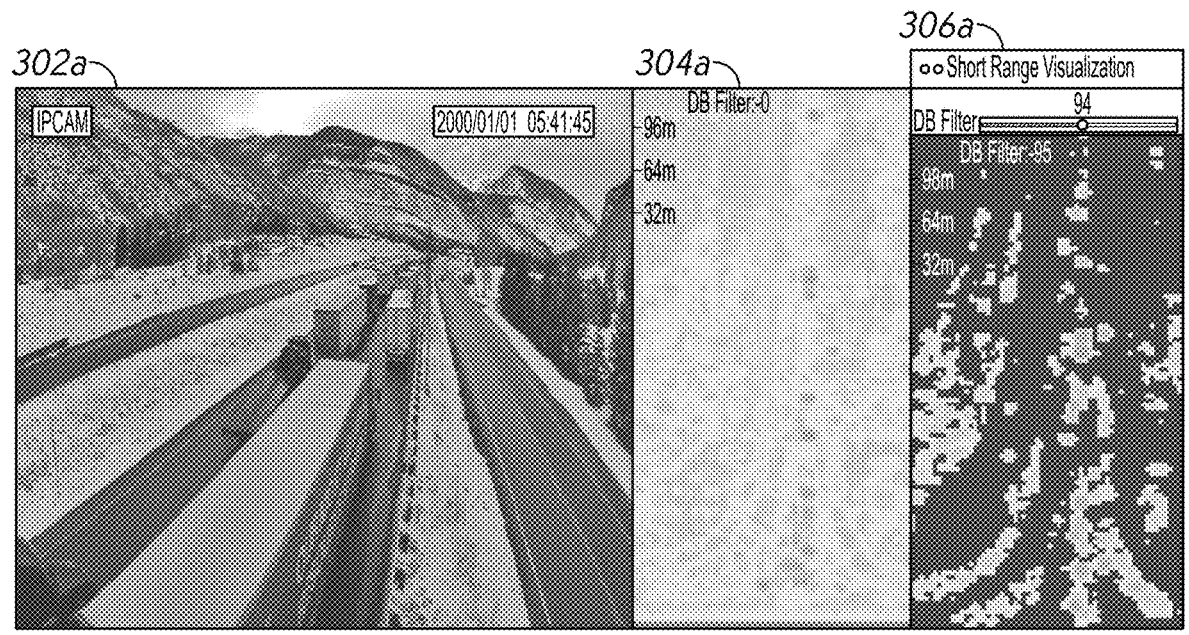
FIGS. 3A and 3B are example data collected by a radar system according to some embodiments of the present disclosure.
Figure 3B:
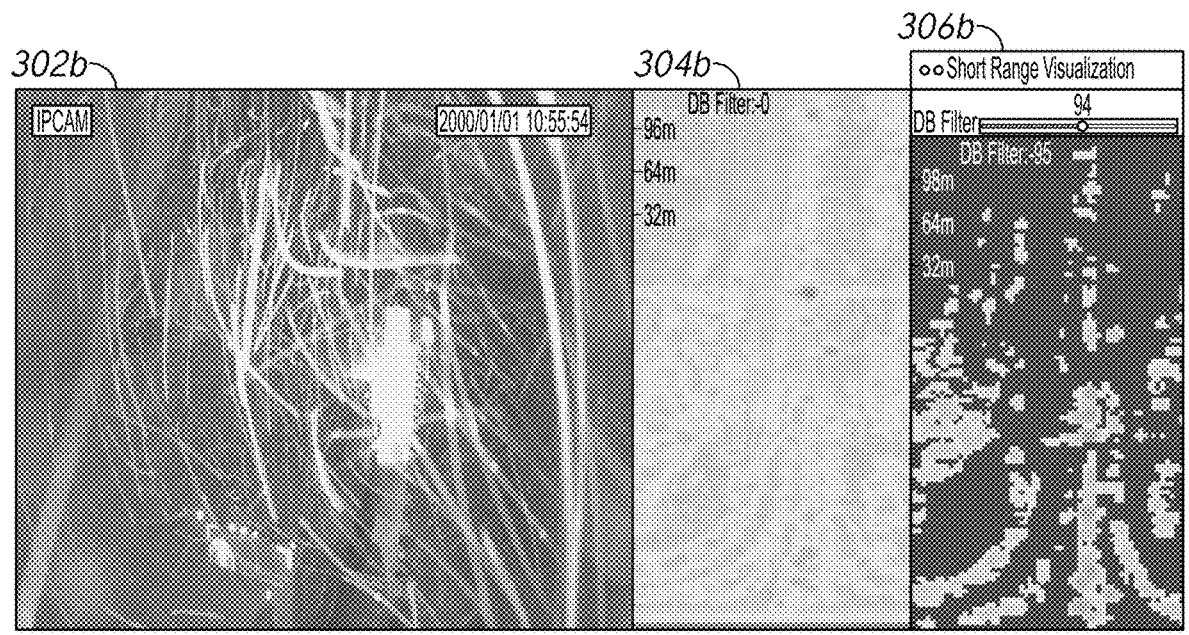

FIGS. 3A and 3B are example data collected by a radar system according to some embodiments of the present disclosure. FIGS. 3A and 3B represent example data collected by an endpoint unit of a radar system (e.g., 200 of FIG. 2). FIGS. 3A-3B represent an application where the radar system is being used to monitor trucks along a highway, to determine whether and where there is enough space for a truck to pull over in order to apply snow chains during winter driving conditions. FIG. 3A represents a set of data collected from an endpoint unit during clear weather at daytime. FIG. 3B represents a set of data collected from the same endpoint unit at night during snowy conditions.

FIG. 3A includes image 302a collected from a camera (e.g., 212 of FIG. 2), raw radar data 304a and filtered radar data 306a collected from a radar image (e.g., 210 of FIG. 2). FIG. 3B includes image 302b collected from a camera (e.g., 212 of FIG. 2), raw radar data 304b and filtered radar data 306b collected from a radar image (e.g., 210 of FIG. 2). The difference between unfiltered and filtered radar data 304a/b and 306a/b may be the application of a noise filter to allow radar reflections to be more clearly visualized. The radar data 304 and 306 represent a visualization of radar reflections rather than processed or identified point cloud data.

As may be seen by comparing the images 302a and 302b, the image is substantially degraded by the lack of light and the heavy snow. It is very difficult to distinguish the presence or location of any features or vehicles in the image 302b. Meanwhile, as may be seen by comparing radar data 304a and 304b or 306a and 306b, the radar data is not degraded by the change in ambient light or by the presence of weather conditions. Accordingly, location of vehicles based on the radar data may maintain their reliability in various ambient conditions.

Figure 4:
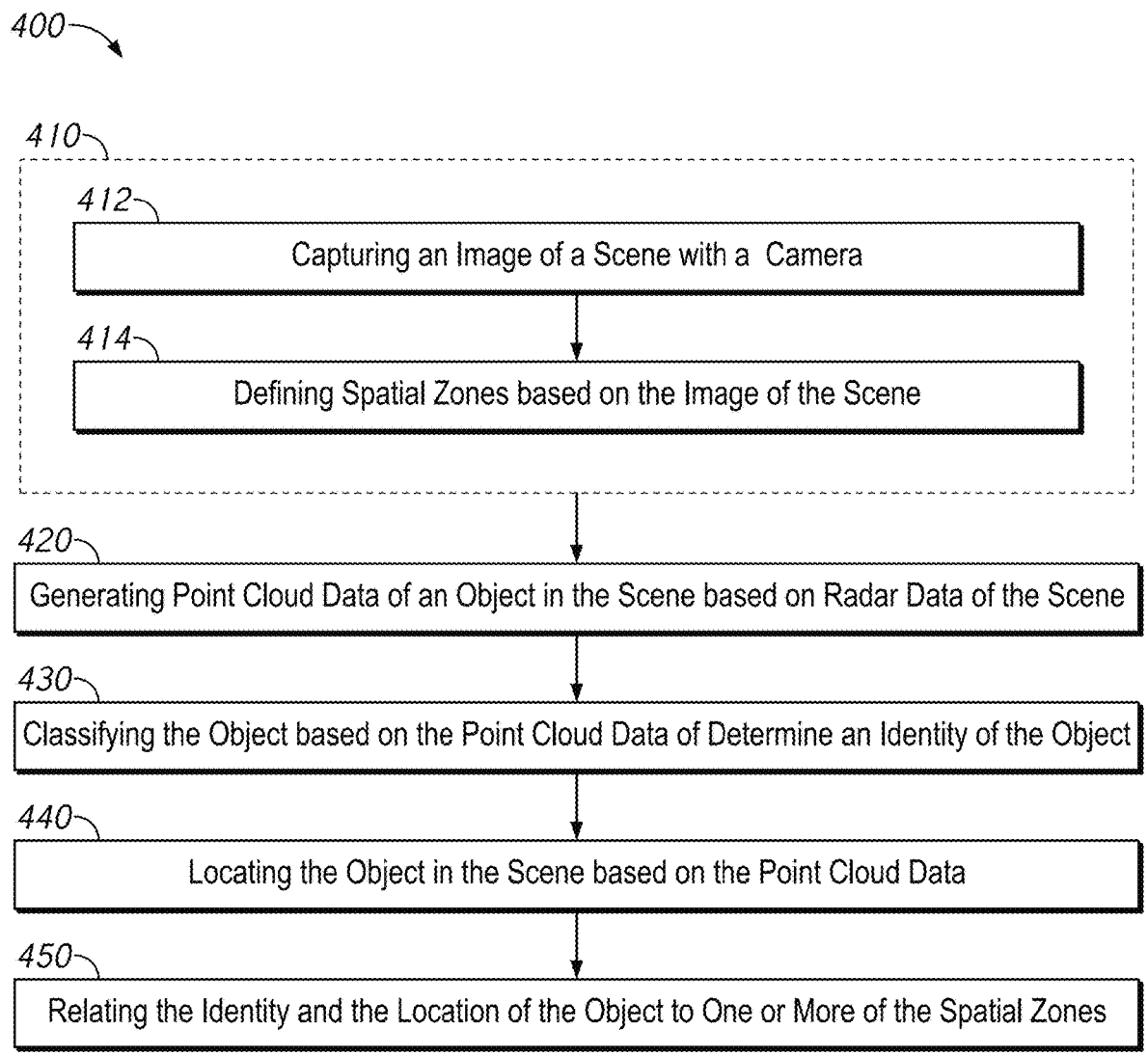
FIG. 4 is a flow chart of a method according to some embodiments of the present disclosure.

FIG. 4 is a flow chart of a method according to some embodiments of the present disclosure. The method 400 may be implemented by one or more of the systems described in FIGS. 1-2.

The method 400 includes an initialization step 410. The initialization step includes box 412, which describes imaging a scene with a camera. The camera may be located in an endpoint unit (e.g., 102 of FIGS. 1 and/or 202 of FIG. 2). The initialization step 410 includes box 414 which describes defining spatial zones based on the image of the scene. The spatial zones may represent a spatial location in the scene and may be associated with a type. Example types may include roadways, sidewalks, crosswalks, bridges, and rivers. Zones may overlap. Zone information may be determined automatically (e.g., with a machine learning model), manually, or combinations thereof.

In some embodiments, multiple endpoint units may each undergo the initialization step 410 and may pass zone information to a base station (e.g., 104 of FIG. 1). The base station may collect and collate the zone information from multiple endpoint units.

In some embodiments, the initialization step 410 may be performed only once at set up. In some embodiments, the initialization step 410 may be repeated (e.g., periodically or upon command), for example to update the zone information and/or to change the application. In some embodiments, a visualization of the image may be presented to a user (e.g., one a display 260 of FIG. 2) and the user may use an input/output system (e.g., a mouse and keyboard, a touchscreen etc.) to manually draw the zones on the image of the scene. In some embodiments, the zones may be set automatically. In some embodiments, initial zones may be generated automatically, and the user may adjust the initial zones manually (e.g., by changing a size or shape of the initial zones, by adding new zones, removing zones, assigning a type to the zones).

In some embodiments, the zones may be define a type of an area, which may typically include different types of objects and activities from one another. For example, in application based on traffic, zones might include road, crosswalk, curb, sidewalk, etc. For example, the zones may be established based on computer vision, and the color, shape, and/or other characteristics may be used to establish the boundaries of the zones. In some embodiments, the zones may be constructs which are useful to a particular application. For example, in an application where traffic is being counted, the zone may be a line, and the system may change a count value each time an identified object (e.g., of a specific type) crosses that line.

The method 400 may include step 420, which includes generating point cloud data of an object based on radar data of the scene. The radar data may be collected by a radar operating at 60 Ghz in some embodiments. The radar may be located on the endpoint unit(s) or other units or modules positioned so as to receive data covering desired view points of the scene. The point cloud data may represent reflections from edges or surfaces of the object. In some embodiments there may be multiple sets of point cloud data from multiple objects in the scene.

The method 400 includes box 430 includes classifying the object based on the point cloud data to determine an identity of the object. The point cloud data may have properties such as reflectivity, doppler velocity, and location. A classifier may determine the identity of the object based on these properties (and/or from properties derived from the measured properties). In some embodiments, additional information may be used, such as which zone(s) the object is located in and/or imaging data from the camera. The classifier may select from a list of possible object identities which is application specific. For example, the classifier may select between pedestrian, vehicle, or cyclist. The classifier may be trained on a data set which is based on the application and/or the system which is used to monitor the scene. For example, the classifier may be trained using a radar which is similar (or identical) to the radar used to generate the point cloud in step 420. Similarly, the classifier may be trained on a data set chosen to match the intended application. For example, if the application involves monitoring a roadway intersection, then the classifier may also be trained on data collected from a (same or different) roadway intersection.

The method 400 includes box 440 which describes locating the object in the scene based on the point cloud data. A centroid of the points of the point cloud data is determined. In some embodiments, each point of the point cloud data has a signal to noise ratio (SNR) and the SNR may be used to weight the point cloud data when determining the centroid. The coordinates of the centroid may be used as a location of the object. In some embodiments, each endpoint unit may include a GPS, which may relate the location of the endpoint to a coordinate system (e.g., latitude and longitude).

The method 400 includes box 450 which describes relating the identity and the location of the object to one or more of the spatial zones. For example, the system may identify a vehicle and locate it on a roadway zone. In some embodiments, one or more actions may be taken based on such relationships. For example, the method 400 may include adjusting the timing of traffic signals.

The method 400 may include presenting information to a user (e.g., by generating a visualization and displaying it on a screen such as display 260 of FIG. 2). For example, the method 400 may include capturing images of the scene (e.g., using the camera such as 212 of FIG. 2) and generating one or more tracking images based on the identified objects in the scene. For example, the tracking images may include overlaying a graphic or visualization around each identified object in the image based on the classified point cloud of that object. For example, the user may see a real-time image captured by the camera of an endpoint unit, and also see a label or other identifier next to each identified object in the scene. The tracking images may include overlays to help indicate identified objects, such as bounding boxes drawn around the identified objects. The bounding boxes may be drawn based on the classified point clouds, but superimposed on the images, since the radar and image data may be registered to each other. Various techniques may be used to aid in the display of the tracking images. For example, different color boxes may be used to indicate different types of identified objects and/or different individual objects. Similarly, the system may display various identifying text, such as label which indicates the unique identifier and/or type assigned to the objects (e.g., Vehicle001, Vehicle002, Bicycle003, etc.). Various options may be presented to a user to allow them to customize the tracking images which are displayed to them.

The user may also be able to see various zones. In some embodiments, the method 400 may include allowing the user to set various conditions, such as defining the properties of one or more of the spatial zones in the scene. In some embodiments, the method 400 may include displaying an output to a user. In addition to being displayed to a user, the system may generate and/or save tracking information based on the identified objects. For example, the tracking information may include recording the movement of the identified objects through the scene. In some embodiments, the tracking information may be used to further increase the accuracy of the radar point cloud data (e.g., to help distinguish between objects when two point clouds merge as the two objects get close together).

For example, an application may involve counting a number of bicycles that travel along a road. During the initialization steps 410, the camera captures an image of the road, and a zone is defined along the road. A zone, such as a line may also be drawn across the road to mark the point where the bicycles should be counted. Once initialized, the system may collect point clouds of objects in the scene and use the classifier to identify them. The user may say real-time images of the traffic along the road, along with markers showing each identified object and/or its type (e.g., car, truck, bicycle, pedestrian, etc.). If an object of the specified type (bicycle) crosses the count zone, then the system may increment a counter. The user may monitor this in real time and may adjust the application as needed (e.g., to count cars instead of bicycles, to only count bicycles travelling in a certain direction etc.).

The steps of the method 400 described by boxes 420 to 450 may be applied to multiple objects simultaneously. For example, multiple point clouds each related to multiple objects may be generated, and each object may be identified and related to the zones. In some embodiments the steps of boxes 420 to 450 may be repeated. For example, the method may identify and locate one or more objects in 'real time' by rapidly updating the information. In some embodiments, a predicted velocity of the object(s) may be found by tracking a change in the location over time.

In some embodiments, the steps of the method 400 may be divided between different processing units. For example, the steps of box 420-440 may be performed by a first processing unit in each of a number of endpoint units, while the steps of box 450 may be performed by a second processing unit in a base station.

In some embodiments, the method 400 may also include training the classifier. The classifier may include a machine learning model. A set of training data, including example point clouds which have been labelled, may be provided to the classifier to train it. The trained classifier may then be used to identify objects. The training of the classifier may be an initial step performed before the endpoint unit(s) and/or base station are positioned in the scene. The training may be performed remotely and the trained classifier may be uploaded to the radar system. In some embodiments, the training data used for the classifier may be selected based on the application.

Figure 5:
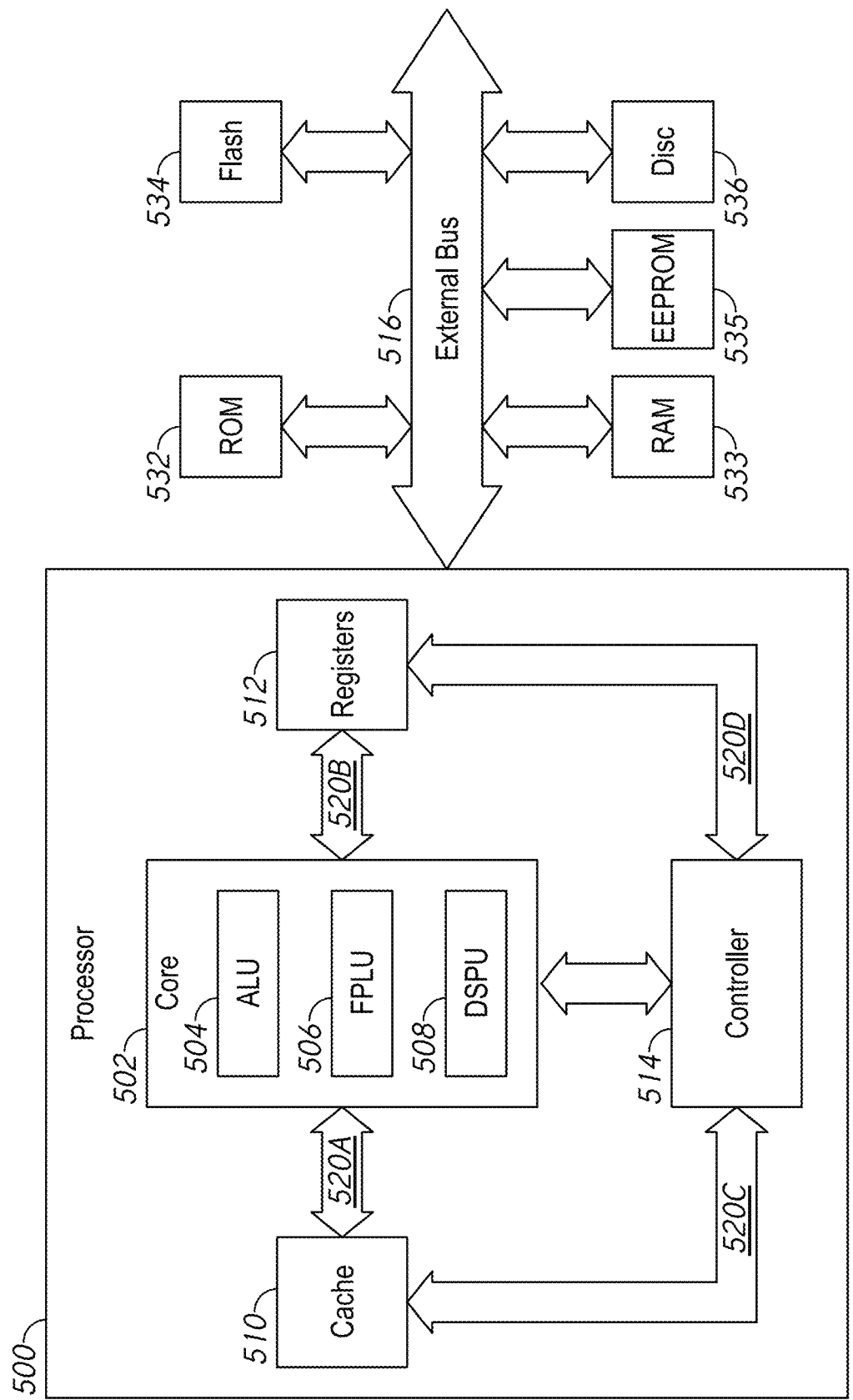
FIG. 5 is a block diagram illustrating an example processor configured to execute an object classification model according to principles of the present disclosure.

FIG. 5 is a block diagram illustrating an example processor 500 which can be configured to execute an object classification model according to principles of the present disclosure. Processor 500 may be used to implement one or more processors described herein, for example, processor 204 and/or 254 of FIG. 2. The term processor may be interchangeable with the term processing unit or processor circuit if used herein. Processor 500 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific integrated circuit (ASIC) where the ASIC has been designed to form a processor, or a combination thereof. The processor 500 may include one or more cores 502. The core 502 may include one or more arithmetic logic units (ALU) 504. In some embodiments, the core 502 may include a floating-point logic unit (FPLU) 506 and/or a digital signal processing unit (DSPU) 508 in addition to or instead of the ALU 504. The processor 500 may include one or more registers 512 communicatively coupled to the core 502. The registers 512 may be implemented using dedicated logic gate circuits (e.g., flip-flops) and/or any memory technology. In some embodiments the registers 512 may be implemented using static memory. The register may provide data, instructions and addresses to the core 502.

In some embodiments, processor 500 includes one or more levels of cache memory 510 communicatively coupled to the core 502. The cache memory 510 may provide computer-readable instructions to the core 502 for execution. The cache memory 510 may provide data for processing by the core 502. In some embodiments, the computer-readable instructions (e.g., instructions 230 and/or 280) may have been provided to the cache memory 510 by a local memory (e.g., memory 220 and/or 270), for example, local memory attached to the external bus 516. The cache memory 510 may be implemented with any suitable cache memory type, for example, metal-oxide semiconductor (MOS)

memory such as static random-access memory (SRAM), dynamic random-access memory (DRAM), and/or any other suitable memory technology.

In some embodiments, the processor 500 includes a controller 514, which may control input to the processor 500 from other processors and/or components included in a system (e.g., radar 210 and camera 212 shown in FIG. 2) and/or outputs from the processor 500 to other processors and/or components included in the system (e.g., display 260 shown in FIG. 2). Controller 514 may control the data paths in the ALU 504, FPLU 506 and/or DSPU 508. Controller 514 may be implemented as one or more state machines, data paths and/or dedicated control logic. The gates of controller 514 may be implemented as standalone gates, FPGA, ASIC or any other suitable technology. The registers 512 and the cache memory 510 may communicate with controller 514 and core 502 via internal connections 520A, 520B, 520C and 520D. Internal connections may implemented as a bus, multiplexor, crossbar switch, and/or any other suitable connection technology.

Inputs and outputs for the processor 500 may be provided via a bus 516, which may include one or more conductive lines. The bus 516 may be communicatively coupled to one or more components of processor 500, for example the controller 514, cache memory 510, and/or register 512. The bus 516 may be coupled to one or more components of the system, such as display 260 mentioned previously.

The bus 516 may be coupled to one or more external memories (e.g., memory 314). In some embodiments, the one or more external memories may include Read Only Memory (ROM) 532. ROM 532 may be a masked ROM, Electronically Programmable Read Only Memory (EPROM) or any other suitable technology. The external memory may include Random Access Memory (RAM) 533. RAM 533 may be a static RAM, battery backed up static RAM, Dynamic RAM (DRAM) or any other suitable technology. The external memory may include Electrically Erasable Programmable Read Only Memory (EEPROM) 535. The external memory may include Flash memory 534. The external memory may include a magnetic storage device such as disc 536. In some embodiments, the external memories may be included in a system, such as radar classification system 200 shown in FIG. 2, for example memory 220 and/or 270.

Figure 6:
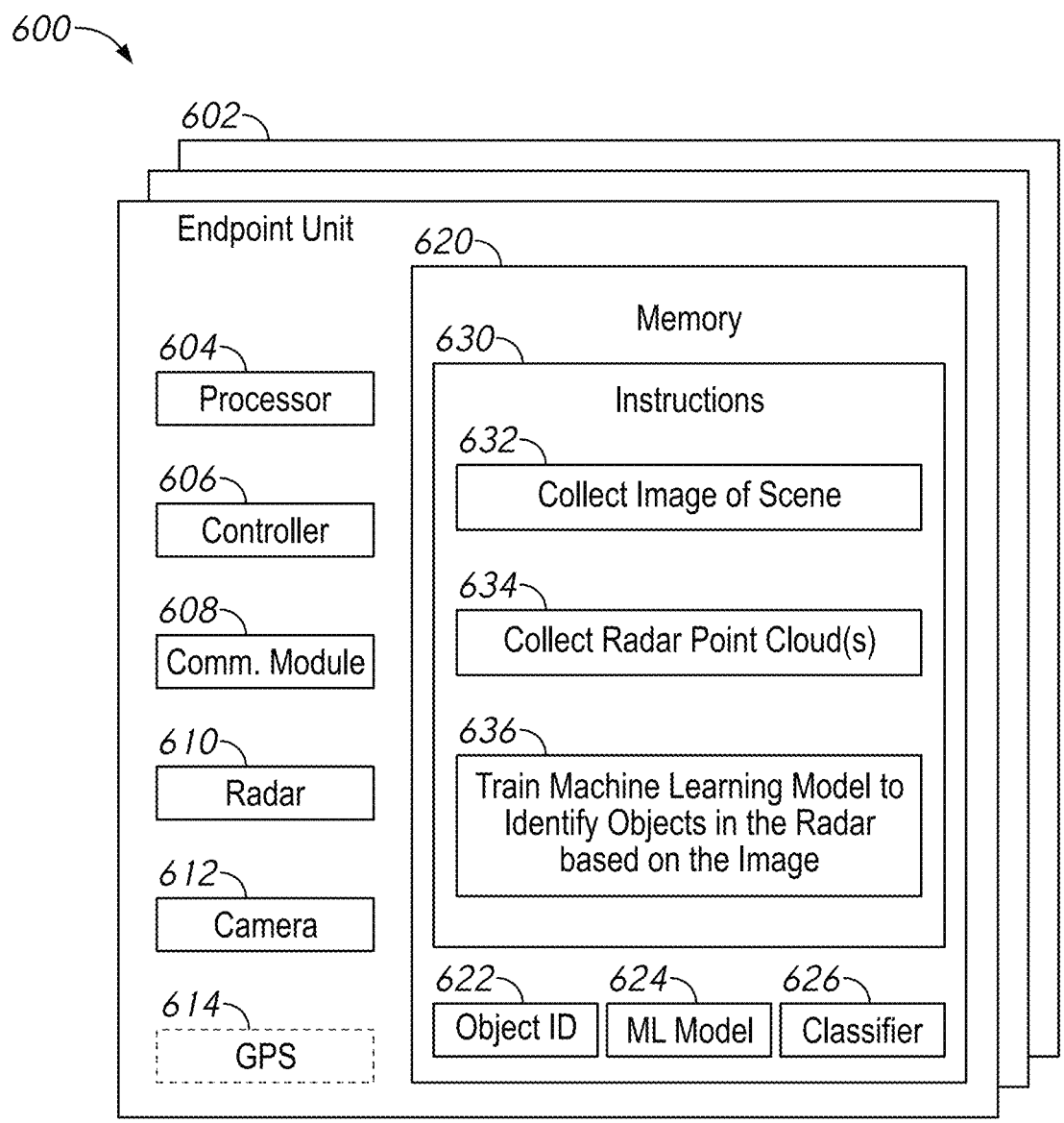
FIG. 6 is a block diagram of an endpoint unit according to some embodiments of the present disclosure.

FIG. 6 is a block diagram of an endpoint unit according to some embodiments of the present disclosure. FIG. 6 shows a system 600 which may be used to train a machine learning model to recognize objects in a scene based on their radar point cloud(s). For example, the system 600 may be used to train a classifier, such as 226 of FIG. 2. In the example of FIG. 6, an endpoint unit 602 (e.g., 102 of FIGS. 1 and/or 202 of FIG. 2) is shown performing the training. However, in some embodiments, the training may be performed on a different system (e.g., on base station 104 of FIG. 1).

The endpoint unit 602 of FIG. 6 may be similar to the endpoint unit 202 of FIG. 2. In some embodiments, the same hardware may be used for training the classifier as is used for monitoring of the scene described in FIG. 2. In some embodiments, the classifier may be trained on hardware different than the hardware used in the application. In some embodiments, the same camera 612 and radar 610 as will be used for the application may be used to generate images for the classifier 226, but a different processor 604 (e.g., a different computer) may be used for training the classifier 226. Since the endpoint unit 602 of FIG. 6 may generally be similar to the endpoint unit 202 of FIG. 2, for the sake of brevity, features and components similar to those described with respect to FIG. 2 will not be repeated again with respect to FIG. 6.

The endpoint unit 602 includes a processor which executes instructions 630 stored in a memory 620 in conjunction with other information, to train a classifier 226. The endpoint unit 602 includes a camera 612 which generates images of a scene, and a radar 610 which generates radar data based on the radar reflection of objects in the scene (e.g., in the form of point clouds). The classifier 226 is the trained product a machine learning model 224, which learns to identify objects based from their radar data based on using images from the camera 612 as training data.

The endpoint unit 602 is positioned in a scene (e.g., 100 of FIG. 1). For example, the endpoint unit 602 may be mounted on a pole or building or otherwise positioned to observe the scene. The memory 620 includes instruction 632, which causes the endpoint unit 602 to capture an image of the scene. For example, the camera 612 may capture an image of a field of view. The image may be 2D image captured using conventional digital photography techniques. The image may be stored in the memory 620. In some embodiments, the camera 612 may capture multiple images in time (e.g., a movie).

The memory 620 includes instructions 634 which cause the endpoint unit 602 to collect radar information, such as radar point cloud(s) using the radar 610. Similar to the images collected by the camera, the radar information may be stored in the memory 620 and may be a time series of data. The images and radar information may be co-registered both in space and time. For example, the fields of view of the camera 612 and radar 610 may overlap. In some embodiments, the images and radar information may be captured simultaneously. Accordingly, if an object appears in the image, it may have a corresponding point cloud in the radar information. Similarly, as the object moves in a sequence of images, its corresponding point cloud will also move. In some embodiments, additional processing may be necessary to register the images and the radar. For example, the radar may include depth information not normally present in the 2D images. Processing may be applied to add a depth dimension to the captured images so that they can be registered with the radar.

The memory 620 includes instructions 636 which describe training a machine learning model 224 to identify objects in the radar information based on the image. For example, objects in the image may be identified, either automatically, manually, or combinations thereof. For example, a user may review a set of images and manually draw a box around each object of a type it is desirous to train the ML model 624 to identify. So in an example application involving traffic, a user may go through the images and identify people, vehicles, and bicycles. In an example application involving security, a user may identify people holding guns vs. people not holding guns. In some embodiments, a different machine learning model trained to recognize objects in images may be used to apply classifications to the objects in the image.

Once the objects in the images are identified, the machine learning model 624 may be trained to classify the point cloud(s) corresponding to that object as sharing the same identify as the image. This process may be iteratively performed for a large number of images and point clouds in order to train a classifier 626. The classifier 626 may then be able to identify objects based on their point cloud(s).

The trained classifier 626 may be saved in the memory 620 of the endpoint unit 602 and may be used during applications to identify objects based on information from the radar 610. In some embodiments, the classifier may be updated over time. For example, during an application if the user notices that an object has been misclassified, they may correct it, which may be used to update the classifier.

Figure 7:
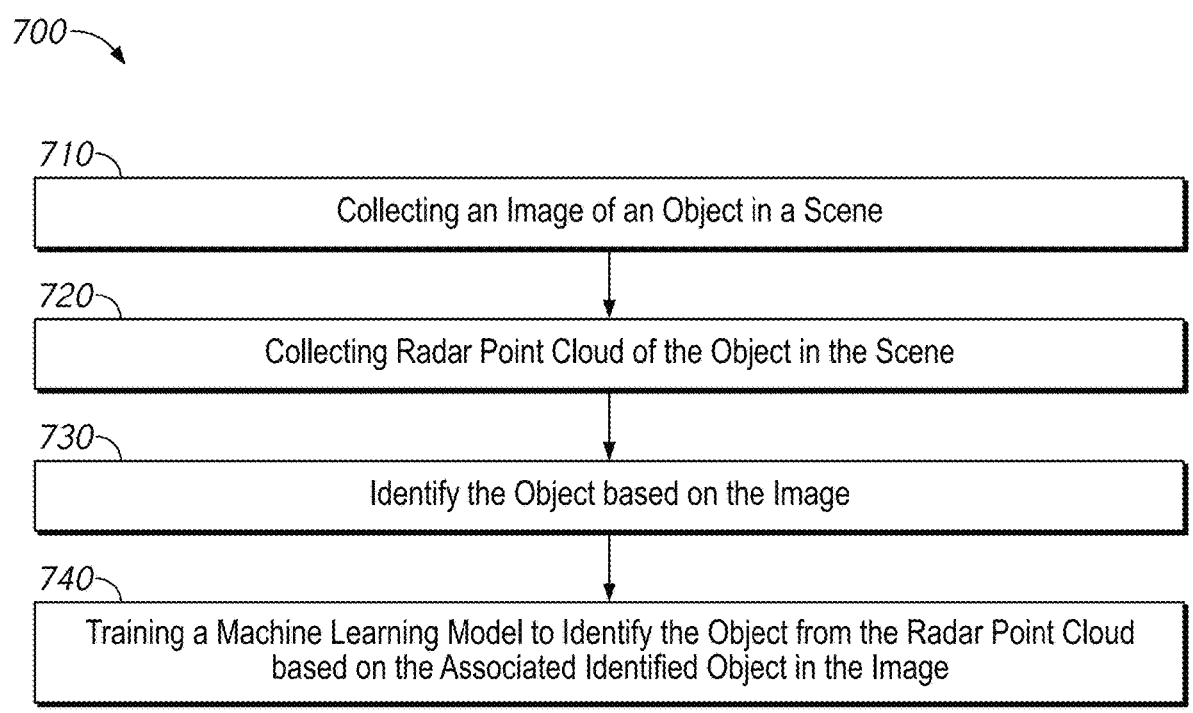
FIG. 7 is a flow chart of a method of training a classifier according to some embodiments of the present disclosure.

FIG. 7 is a flow chart of a method of training a classifier according to some embodiments of the present disclosure. The method 700 may be used to train a classifier, such as 226 of FIGS. 2 and/or 626 of FIG. 6. For example, the method 700 may be implemented in the instructions 620 of the endpoint unit 602 of FIG. 6.

The method 700 includes box 710 which describes collecting an image of an object in a scene. The image may be captured using a camera, such as 103 of FIG. 1, 212 of FIGS. 2 and/or 612 of FIG. 6. In some embodiments, the image may be part of a sequence of images. The method 700 includes box 720 which describes collecting at least one radar point cloud of the object in the scene. While a single object is described for the sake of clarity, each image may include a number of objects and their corresponding point clouds. The point cloud may also be part of a sequence of data (e.g., both the images and the radar point cloud may record the object over time), and the machine learning model may be trained based on the sequences.

In some embodiments, the method 700 may include registering the image of the object to the point cloud of the object, in space and/or time. In other words, the method 700 may include matching the object in the image to the associated point cloud in the radar data. For example, if the image and the radar point cloud are collected separately as part of a respective sequence of images and radar data over time, then the method 700 may include matching a time signature of the image to a time signature of the radar data to find the point cloud which corresponds to the moment the image was captured. Similarly, the method 700 may include matching a field of view of the image to the field of view of the radar to register the object in the image to the point cloud. In some embodiments, the registration may be inherent to the way in which the image and point cloud were captured. For example, if they were captured simultaneously, then they may already be registered in time.

In some embodiments, additional processing may be required to register the image of the object to the point cloud of the object. For example, the radar data may locate objects based on their distance from the radar unit, while the collected image may be two-dimensional and flatten a depth dimension. Accordingly, in some embodiments, the image may be processed to estimate the distance of objects from the camera, which may be used to match the object visible in the image with the associated point cloud in the radar data.

The method 700 continues with box 730, which describes identifying the object based on the image. The identification may be manual, automatic, or combinations thereof. For example, in an embodiment which is all manual, a user may be presented with the image (e.g., on display 260 of FIG. 1) and the user may locate each object (e.g., by drawing an outline or box around the object) and assign an identity to each object. For example, in an embodiment with a mix of manual and automatic identification, a machine vision tool may be used to segment objects in the image, and a user may manually label them to assign an identity to each object. For example, in an embodiment which uses automatic identification, a (separately trained) existing classifier may be used to locate and identify objects in the image.

Which objects are identified, and the types of identities which are assigned to them may depend on a desired application for the trained classifier. For example, if traffic based applications are desired, then vehicles, pedestrians may be identified. If the application requires it, then different types of vehicles may be identified, such as cars, trucks, motorcycles, etc. In another example, if a security based application is desired, then the classifier may be trained to distinguish between different types of objects which may represent threats or non-threats, such as a person not holding a gun and a person holding a gun. In some embodiments, the images and radar data used to train the classifier may be collected based on the desired objects to identify. For example, if it is desirous to train the classifier to recognize vehicles, then the images and radar data may be collected along a street, whereas if it is desired to identify people, then a busy pedestrian are may be selected.

The method 700 continues with block 740, which describes training a machine learning model to identify objects from their radar point cloud based on the associated identified object in the image. Since each object in the image has a corresponding point cloud, and since the image is labelled with the identity of the object, the machine learning model may be trained to identify the point cloud based on the known identity of the associated image. This may be advantageous, as it may be relatively easy and intuitive for a user to identify objects based on their image (and/or machine vision libraries which identify objects in images may be pre-existing), while identifying objects based on their radar point cloud may be difficult and non-intuitive. Once the machine learning model is trained to generate a classifier, the model may be used to classify other objects. For example a second point cloud may be collected of a second object (using a same or a different radar), and the second object may be identified with the trained machine learning model.

In some embodiments, the object may exist across a range of images taken in time, for example as a vehicle drives along the road. This may be useful to train the classifier to recognize the point cloud of an object as it moves relative to the radar unit (which may change a size and shape of its radar cross section, and thus its point cloud).

Figure 8:
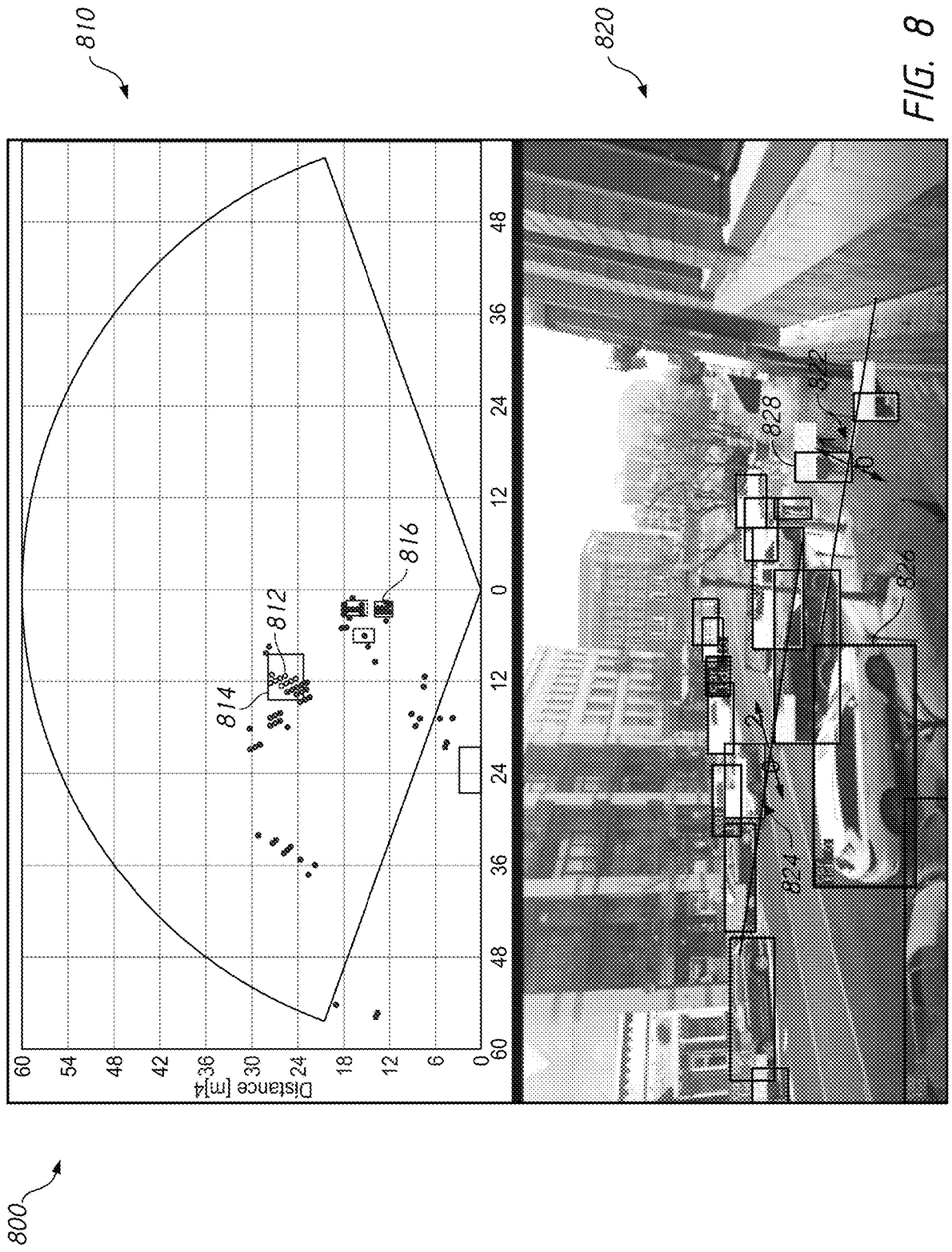
FIG. 8 is an image of a user interface according to some embodiments of the present disclosure.

FIG. 8 is an image of a user interface according to some embodiments of the present disclosure. The user interface 800 may, in some embodiments, represent the operation of a radar classification system such as 101 of FIGS. 1 and/or 200 of FIG. 2. The user interface represents one potential visualization which may be presented to a user of the system, either while it is in operation, or as pre-recorded data.

The user interface 800 shows two windows 810 and 820. The first window 810 shows a visualization of the radar data, while the second window 820 shows an image along with the identified objects in that image (which are identified based on the radar data). The number and type of windows displayed may be an option to the user, and may be adjusted. For example, in some embodiments, the user may select a single window which shows the image along with radar data super-imposed on it. In some embodiments, the radar data may only displayed for diagnostic or technical purposes and may not be shown as part of a normal view.

The first window 810 shows a graphic which represents a field of view of the radar (e.g., as shown by the circle segment). Superimposed on that graphic are visualizations of the radar data, in the form of point clouds, such as the point cloud 812. The display 810 may include a tracking image where an overlay 814 is presented over the point cloud 812 to show that the point cloud 812 represents a tracked object. In some embodiments, the tracking image may be associated with a tracking image in the second window 820 (e.g., with colors, labels etc.) to indicate that they represent the same object. In some embodiments, additional information may be used, for example, the points of the point cloud may be colored to show which points are identified as part of which object by the classifier. Multiple different tracking images may be presented, such as the overlays 814 and 816, each of which represent different objects. Various filters may be used to simplify the display, for example to only display the point clouds of objects which have recently moved. In some embodiments, various overlays may be presented on the first window 810 to represent identified objects (e.g., by superimposing a box over the point cloud associated with the object).

The second window 820 shows a view of an image. The display may update over time to present a movie of the objects (traffic in this case) moving through the scene. The window includes tracking images which include superimposed elements to demonstrate the operation of the classifier. For example, each object identified based on the point cloud information, such as vehicle 826 shows a bounding box superimposed over it. Similarly, pedestrian 828 also has a bounding box superimposed. While the objects are identified based on the radar data, the identified object may be marked in the image since images are generally more accessible to users. Along with a box to indicate the identified object, the system may also display a marker or other identifier of the type of object. For example, each object may be given a type and a sequential ID number such as Vehicle001, Vehicle002, etc. or Pedestrian001 and so forth. In the example embodiment of FIG. 8, each object has been assigned a unique tracking identification number (tid) as well as a label which indicates the type of object. For example object 826 has been assigned a tid 0 and is identified as a car and object 828 has been assigned a tid of 15 and is identified as a person. This may help identify how the system tracks unique individual objects as they travel through the scene.

Also shown in the second window 820 are two zones 822 and 824, which have been set by a user for a traffic survey. Both of the zones 822 and 824 may be lines, with the zone 822 drawn across a sidewalk and the zone 824 drawn across a road. The system may count a number of identified pedestrians which cross the first zone 822 and a number of vehicles which cross the second zone 824. In some embodiments, the system may separately count the directions of objects crossing the zones. For example, the zone 824 may have a first counter for vehicles which cross it traveling a first direction and a second counter for vehicles which cross it traveling the opposite direction. The counters may also be displayed and presented to the user. If desired, a user may readjust the zones, reset the counts, save the counts, allow the system to run over a set period of time etc.

It should be understood that any one of the examples, embodiments or processes described herein may be combined with one or more other examples, embodiments and/or processes or be separated and/or performed amongst separate devices or device portions in accordance with the present systems, devices and methods. Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
a camera configured to collect an image of a scene;
a radar unit configured to generate data based on radar reflections from one or more objects in the scene;
a processor; and
machine readable instructions, which when executed by the processor, cause the apparatus to:
define a first spatial zone and a second spatial zone in the scene based on the image during an initialization mode;
determine a point cloud for each of the one or more objects based on the data from the radar unit during an operational mode;
classify each of the one or more objects based on the point cloud to determine an identity of the object during the operational mode;
determine a position of the object within a scene based on the point cloud during the operational mode; and
relate the position and identity of each of the one or more objects determined during the operational mode to the first and the second spatial zones set up during the initialization mode to determine if the location of the object is within the first spatial zone, within the second spatial zone, or outside the first and the second spatial zone.

2. The apparatus of claim 1, wherein the apparatus is configured to control a traffic signal based on the relationship between the identity and position of the one or more objects to the first spatial zone and the second spatial zone.

3. The apparatus of claim 1, wherein the radar is configured to generate first data at a first time and second data at a second time, and wherein the machine readable instructions, when executed by the processor cause the apparatus to determine a velocity of each of the one or more objects based on a change in position between the first data and the second data.

4. The apparatus of claim 1, wherein the radar unit is configured to operate using 60 GHz electromagnetic radiation.

5. The apparatus of claim 1, wherein the machine readable instructions, when executed by the processor cause the apparatus to update the relationship of the identity and position of the object one or more objects to the first and the second spatial zones in real time.

6. The apparatus of claim 1, further comprising a display, wherein the machine readable instructions, when executed by the processor cause the system to display a tracking image on the display.

7. A method comprising:
detecting an image of an object in a scene;
capturing point cloud data of the object in the scene with a radar;
identifying the object based on the image; and
training a machine learning model to identify the object from the radar point cloud data based on the associated identified object in the image;
collecting second images of a scene as part of an initialization mode;
determining a first spatial zone and a second spatial zone in the scene based on the second images as part of the initialization mode;
collecting second point cloud data of a second object using a same or a different radar as part of an operational mode after the initialization mode; and identifying the second object using the trained machine learning model and relating its location to the first spatial zone and the second spatial zone as part of the operational mode to determine if the location of the second object is within the first spatial zone, within the second spatial zone, or outside the first and the second spatial zone.

8. The method of claim 7, further comprising registering the image to the point cloud data.

9. The method of claim 7, further comprising detecting images based on an application of the trained machine learning model.

10. The method of claim 7, further comprising collecting the image using a camera, wherein the camera and the radar are both located in an endpoint unit.

11. The method of claim 7, further comprising:
detecting a sequence of images each including the object;
capturing a sequence of point cloud data of the object; and
training the machine learning model to identify the object in the sequence of point cloud data based on the sequence of images.

12. The method of claim 7, further comprising training the machine learning model to identify the object as a vehicle, a pedestrian, or a bicycle.

13. A method comprising:
capturing an image of a scene with a camera during an initialization mode;
defining a first spatial zone and a second spatial zone based on the image of the scene during an initialization mode;
generating point cloud data of one or more objects in the scene based on radar data of the scene during an operational mode;
classifying each of the one or more objects based on the point cloud data to determine an identity of the one or more objects during the operational mode;
locating each of the one or more objects in the scene based on the point cloud data during the operational mode; and
relating the identify and the location of each of the one or more objects to the first spatial zone and the second spatial zone during the operational mode and determining if the location of the object is within the first spatial zone, within the second spatial zone, or outside the first spatial zone and the second spatial zone.

14. The method of claim 13, wherein the scene includes a road and wherein the method includes classifying the one or more objects as a vehicle, a pedestrian, or a cyclist.

15. The method of claim 14, further comprising adjusting the timing of a traffic signal based on the relationship between the identity and location of one or more objects to the first spatial zone and the second spatial zone.

16. The method of claim 13, further comprising generating the point cloud data with a first processor in an endpoint unit and relating the identity and the location of the one or more objects to the first spatial zone and the second spatial zone with a second processor in a base unit.

17. The method of claim 13, further comprising collecting the radar data at 60 GHz.

18. The method of claim 13, further comprising locating the one or more objects at a first time and a second time and determining a velocity of the one or more objects based on the location of the one or more objects at the first time and the location of the one or more objects at a second time.

19. The method of claim 13, further comprising displaying tracking images of the identified one or more objects.

20. A system comprising:
at least one endpoint units, each comprising:
a camera configured to collect an image of a scene during an initialization mode;
a radar unit configured to generate data based on an object in the scene during an operational mode;
a first processing unit configured to generate point cloud data based on the data from the radar, and classify an identity of the object based on the point cloud data during the operational mode;
a base station comprising a second processing unit configured to determine a first spatial zone and a second spatial zone in the scene based on the image during the initialization mode, and during the operational mode receive the Identity and the location of the object from the at least one endpoint units and relate the location and the identity of the object to the first spatial zone and the second spatial zone in the scene to determine if the location of the object is within the first spatial zone, within the second spatial zone, or outside the first spatial zone and the second spatial zone.

21. The system of claim 20, wherein the at least one endpoint units can be positioned to image a roadway and wherein each of the first processing units is configured to classify the object as a vehicle, a pedestrian, or a cyclist.

22. The system of claim 20, wherein the base station is further configured to adjust timing of a traffic signal based on the relationship of the location and identity of the object to the spatial zone information.

23. The system of claim 20, wherein the base station is further configured to display tracking images based on the identity and the location of the object.

24. The system of claim 20, wherein the base station is configured to count a number of a type of object which crosses the first spatial zone, the second spatial zone, or both.

* * * * *